United States Patent Office 2,826,393
Patented Mar. 11, 1958

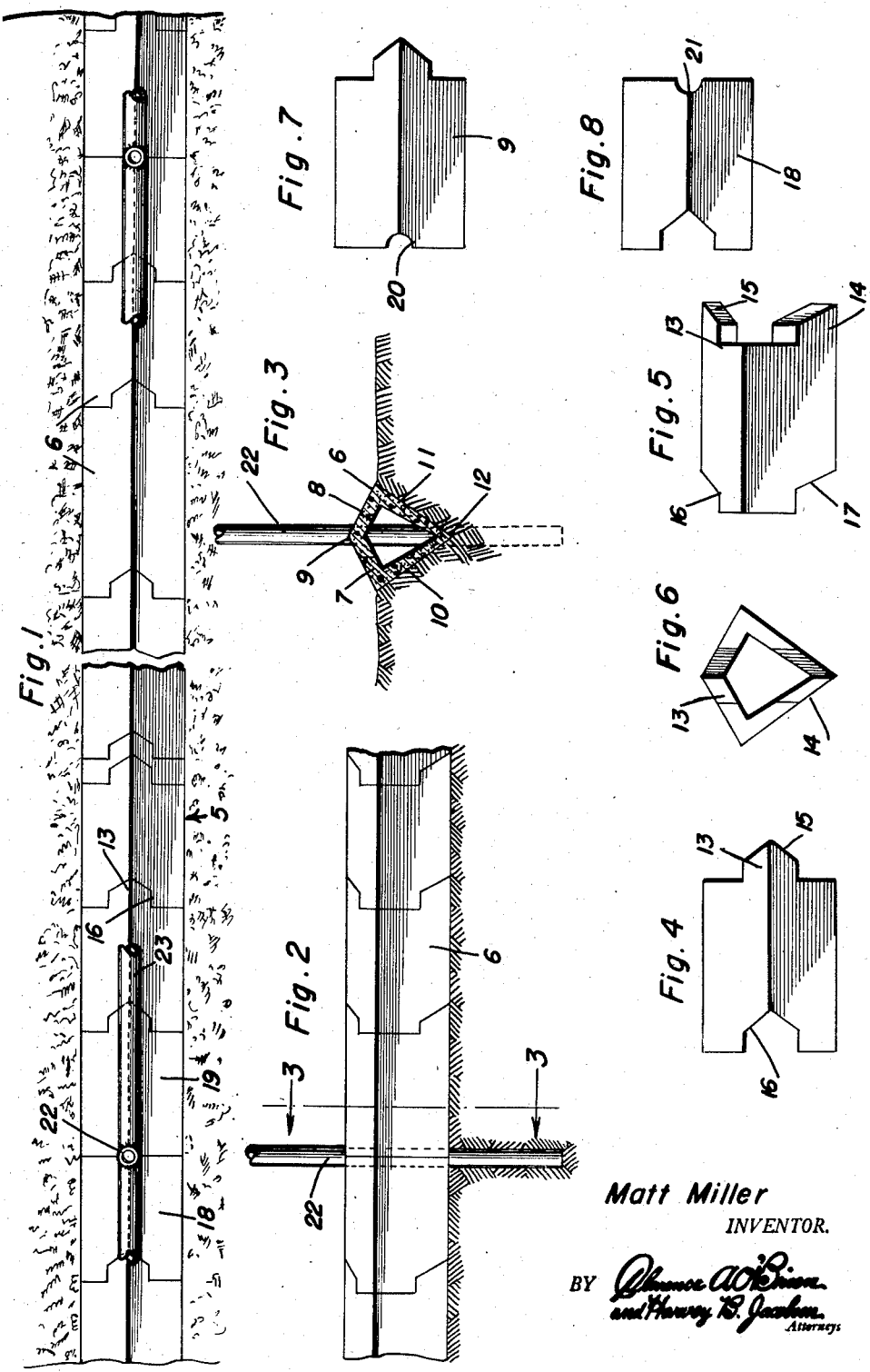
Matt Miller
INVENTOR.

2,826,393

VEGETATION RESTRICTING DEVICE FOR FENCE ROWS

Matt Miller, Houston, Tex.

Application July 21, 1954, Serial No. 444,707

1 Claim. (Cl. 256—19)

The present invention relates to the art of restricting the growth of grass, weeds or other vegetation directly under a fence in order to facilitate cutting of the vegetation or other growth close to a fence row and without danger of a mower striking the fence.

An important object of the invention is to provide a sectional hollow member adapted for embedding in the surface of the soil directly under a fence and which restricts the growth of vegetation in close proximity to the fence.

Another object of invention is to provide a sectional elongated hollow body of deltoid shape in cross section and adapted for embedding in the soil at the surface thereof directly under a fence to retard the growth of vegetation in the region thereof and in which the hollow body is formed with openings for mutually anchoring the body and the fence post in the ground.

A still further object of invention is to provide a sectional elongated body constructed with interlocking means to retain the sections of the body in longitudinal alignment with each other.

An additional object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view;

Figure 2 is a side elevational view;

Figure 3 is a transverse sectional view taken on the line 3—3 of Figure 2;

Figure 4 is a top plan view of one of the interlocking sections;

Figure 5 is a side elevational view thereof;

Figure 6 is an end elevational view; and

Figures 7 and 8 are top plan views of the matching fence post anchoring sections of the device.

Referring now to the drawing in detail wherein for the purpose of illustration I have disclosed a preferred embodiment of invention, the numeral 5 designates the vegetation restricter generally which is of elongated construction and composed of a plurality of hollow sections 6 of deltoid shape in cross section and each of which includes top portions 7 and 8 sloping downwardly in obtuse angled relation toward each side of the hollow section from a longitudinal ridge 9.

The sides 10 and 11 of the hollow section converge to a lower longitudinally extending tip 12 which is positioned in the vertical plane of the ridge 9.

Each section 6 of the elongated body 5 is constructed at one end with upper and lower locking tongues 13 and 14, each formed with bevelled side edges 15 and adapted to enter in complementary shaped upper and lower notches or recesses 16 and 17, respectively, of an adjacent section to connect the sections of the body in interlocking end to end relation with respect to each other.

A pair of adjacent sections designated at 18 and 19 are formed at their abutting ends with matching grooves 20 and 21, respectively, adapted to receive a fence post 22 and with the assembled sections 6 of the body 5 recessed in the surface of the soil in longitudinal alignment with and directly under the fence 23.

By placing the elongated hollow body 5 in the surface of the soil and centered under the fence 23 the growth of vegetation in the immediate vicinity of the fence is restricted so that a mower may travel close to the fence without danger of striking the same.

The sections 6 of the elongated hollow body may be constructed of concrete or other suitable material.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In combination with a fence having alined posts driven into the ground, of a vegetation growth restricting device comprising a plurality of elongated hollow members arranged in end to end adjoining relation in the ground in the line of the posts, said members being of deltoid shape in cross section with upwardly projecting tops of obtuse angle form in cross section extending above the ground and forming a top ridge on the device, said members having downwardly converging sides forming a bottom ridge on the device, said posts being interposed between adjoining members which are provided with apertures in the ridges of the device through which said posts extend and are removable upwardly.

References Cited in the file of this patent

UNITED STATES PATENTS

| | | |
|---|---|---|
| 1,378,735 | Talbot | May 17, 1921 |
| 1,872,526 | Techmer | Aug. 16, 1932 |
| 1,916,494 | Schrickel | July 4, 1933 |
| 2,298,184 | Von Rosenburg | Oct. 6, 1942 |
| 2,336,120 | Null | Dec. 7, 1943 |
| 2,436,593 | Moselowitz | Feb. 24, 1948 |
| 2,659,578 | Clendenin | Nov. 17, 1953 |

FOREIGN PATENTS

| | | |
|---|---|---|
| 4,322 | Great Britain | 1878 |
| 801,908 | France | Aug. 21, 1936 |